(12) United States Patent
Chase (10) Patent No.: US 9,232,242 B2
(45) Date of Patent: Jan. 5, 2016

(54) TECHNIQUES TO BROADCAST A NETWORK TELEVISION PROGRAM

(71) Applicant: CBS INTERACTIVE INC., San Francisco, CA (US)

(72) Inventor: James M. Chase, Mount Laurel, NJ (US)

(73) Assignee: CBS INTERACTIVE, INC., New York, NY (US)

( * ) Notice: Subject to any disclaimer, the term of this patent is extended or adjusted under 35 U.S.C. 154(b) by 239 days.

(21) Appl. No.: 13/711,209

(22) Filed: Dec. 11, 2012

(65) Prior Publication Data

US 2014/0165097 A1 Jun. 12, 2014

(51) Int. Cl.
| | |
|---|---|
| *H04N 7/10* | (2006.01) |
| *H04N 21/234* | (2011.01) |
| *H04N 21/24* | (2011.01) |
| *H04N 21/2665* | (2011.01) |
| *H04N 21/858* | (2011.01) |

(52) U.S. Cl.
CPC ..... *H04N 21/23424* (2013.01); *H04N 21/2407* (2013.01); *H04N 21/2665* (2013.01); *H04N 21/858* (2013.01)

(58) Field of Classification Search
CPC ...... H04N 21/63; H04N 21/633; H04N 21/81
USPC .......................................................... 725/36
See application file for complete search history.

(56) References Cited

U.S. PATENT DOCUMENTS

| | | | | |
|---|---|---|---|---|
| 5,327,468 | A  * | 7/1994 | Edblad et al. ................. | 375/356 |
| 2003/0139898 | A1 * | 7/2003 | Miller et al. .................. | 702/178 |
| 2009/0049188 | A1 * | 2/2009 | Suneya et al. ................ | 709/231 |
| 2010/0122305 | A1 * | 5/2010 | Moloney ........................ | 725/93 |
| 2012/0114306 | A1 * | 5/2012 | Aldrey et al. ................. | 386/251 |

\* cited by examiner

*Primary Examiner* — Gigi L Dubasky (74) *Attorney, Agent, or Firm* — Kacvinsky Daisak Bluni, PLLC (57) ABSTRACT

Techniques to automatically switch among video signals in a television broadcast are disclosed. A trigger decoder may receive a network video signal for a network program. The network video signal may be comprised of a video signal and a trigger control signal. The trigger control signal may comprise a time period indicative of how long until a station break is to occur within the network program. The trigger decoder may separate the video signal from the trigger control signal. A latency adjuster may determine a delay between the transmission of the network video signal and the reception of the network video signal. A master control switcher clock may be reset based on the delay. The master control switcher may receive the video signal for the network program, and one or more video signals from one or more video servers containing video content. The master control switcher may select one of the video signals to output, wherein the time for switching from the video signal for the network program to another video signal is controlled by the trigger control signal and the reset clock.

30 Claims, 8 Drawing Sheets

| 510 start time | 520 duration | 530 content title | 540 source | 545 content type |
|---|---|---|---|---|
| 11/20/2012 23:27:50 | 00:06:35 | PROGRAM – Local News | VS1 | PROGRAM - Local |
| 11/20/2012 23:34:25 | 00:00:05 | PROMOTION – NCIS | VS2 | CBS Promotion |
| 11/20/2012 23:34:30 | 00:00:30 | LOCAL SPOT – Tide Detergent | VS1 | SPOT |
| 11/20/2012 23:35:00 | 00:12:30 | PROGRAM - Late Show – David Letterman | Network | PROGRAM - Network |
| 11/20/2012 23:47:30 | 00:01:20 | LOCAL SPOT – Budweiser | VS1 | SPOT |
| 11/20/2012 23:48:50 | 00:00:20 | PROMOTION – Person 2 Person | VS2 | CBS Promotion |
| 11/20/2012 23:49:10 | 00:01:20 | LOCAL SPOT – Chevrolet | VS1 | SPOT |
| 11/20/2012 23:50:30 | 00:11:30 | PROGRAM - Late Show – David Letterman | Network | PROGRAM - Network |
| 11/21/2012 00:02:00 | 00:01:20 | LOCAL SPOT – Movie Ad (Twilight) | VS1 | SPOT |
| 11/21/2012 00:03:20 | 00:00:20 | PROMOTION - Mentalist | VS1 | CBS Promotion |
| 11/21/2012 00:03:40 | 00:10:45 | PROGRAM - Late Show – David Letterman | Network | PROGRAM - Network |

TECHNIQUES TO BROADCAST A NETWORK TELEVISION PROGRAM

BACKGROUND

In the early 1970's network broadcasters saw a need for their local television stations to have an automated master control system that worked hand in hand with a traffic and sales system. The initial goal was to create sales orders and a schedule that could then be formatted into a file that could be loaded into a computer system. This computer would then control the systems used in the master control operation. Finally the completed log with accurately logged air times and log discrepancies would be returned to the sales system allowing for an automated billing to clients. That traffic and sales system originally ran on a mainframe computer system. These two systems would later become the Integrated Broadcast System (IBS) and Real-Time (RT) system respectively.

Network broadcasters such as CBS also own and operate many local affiliate stations throughout the country. Each of these local stations broadcasts the network master schedule in addition to local programming (e.g., local news) that does not come from the network. The master schedule is a detailed down to the second account of that day's programming. Programming may include television programs, advertisement spots, and promotions of network programs hereinafter referred to as programs and spots. Television programs may be pre-recorded or live.

Today, consumers may obtain television service from one of many different alternatives. In addition to over-the-air (OTA) reception of locally broadcast television signals, consumers may receive television programming through service providers such as cable television service providers, satellite television service providers, and television over telephone line service providers. A network delivers its broadcast schedule and content to each of its local stations (e.g., affiliates). The local stations must then insert the various spots into the schedule along with the programs and distribute a broadcast signal to each of the television service providers as well as broadcast the signal over-the-air. The spots must be inserted during local station breaks at exactly the right moment by the local station to avoid even momentary black screen conditions that may be caused when transitioning from the program to a local station break.

For many programs, the network may tweak the schedule by adjusting when the station breaks may occur for a given program. Often these adjustments are made very close to the actual airing of the program. The local stations must be able to adjust to the revised schedule to ensure the station breaks are updated accordingly. A network video signal is typically sent to the local station via a satellite connection which creates a slight albeit noticeable delay. The network video signal may be comprised of the video signal itself (e.g., content of a program) as well as a control signal. The control signal may include a trigger control signal that marks a point in the program to indicate that a station break will occur within the program in x seconds. The trigger control signal, however, does not factor a local delay ($\delta$) that may occur as a result of the transmission time from network facility to local station.

Accounting for the delay is necessary to avoid unwanted black screen moments when the network video signal and local schedule are not totally in sync with one another.

SUMMARY

Various embodiments are generally directed to techniques to automatically switch among video signals in a television broadcast. A local television station broadcast may be the result of coordinating multiple video signals and deciding which one to air at any given moment. The multiple video signals may come from multiple sources and may include video content for programs, advertisements (e.g., spots), and promotions. A master control switcher component may be responsible for selecting which video signal to broadcast at any given moment and switching to a video source that contains the intended video signal. The master control switcher component may be aided in this task by a precise air schedule of programs and spots. One of the video signals may be a network video signal for a program that is transmitted from a network source to the local station over a satellite connection. In addition, some network programs may include station break trigger control signals embedded with the video content data. The station break trigger control signals may mark a countdown point in the network video signal after which a station break occurs and the master control switcher component should cue up a different video signal to broadcast.

A trigger decoder within an RT system at the local station may receive the network video signal for a network program from the network. The network video signal may be comprised of a video signal (e.g., video content for the program) and the trigger control signal. The trigger control signal may comprise a time period indicative of how long until a station break is to occur within the network program. The trigger decoder may separate the video signal from the trigger control signal. A latency adjuster may determine a delay between the transmission of the network video signal and the reception of the network video signal. A master control switcher clock may be reset based on the delay. The master control switcher may receive the video signal for the network program, and one or more video signals from one or more video servers containing video content. The master control switcher may select one of the video signals to output, wherein the time for switching from the video signal for the network program to another video signal is controlled by the trigger control signal and the reset clock.

Certain illustrative aspects are described herein in connection with the following description and the annexed drawings. These aspects may be indicative of the various ways in which the principles disclosed herein can be practiced. In addition, these aspects and any equivalents are intended to be within the scope of the claimed subject matter. Other advantages and novel features will become apparent from the following detailed description when considered in conjunction with the drawings.

DETAILED DESCRIPTION

The integrated broadcast system (IBS) is an updated traffic and sales system intended to create sales orders and a network broadcast schedule that may then be formatted into a file that could be loaded into a computer system. Along with tools designed for sales tracking, inventory control, rate card, program formatting and more, IBS affords account executives, traffic operations managers, sales assistants and others a windows based program designed to easily complete the tasks necessary for creating network broadcast schedules for a master control automation system.

Another component, the Traffic Master system (TM), is a menu driven application residing on a TM server used to create, edit and modify a network broadcast schedule of programs and spots. Programs may include, but are not limited to, scripted television shows, unscripted television shows, sporting events, newscasts, and movies among other video content. Spots may include, but are not limited to, advertisements, network promotions promoting programs, and public service announcements.

TM is a server application that affords multiple users access to these functions at the same time. TM is not limited to these functions and additionally provides a platform to generate reports, track schedule, log and inventory history. TM is designed to accept a completed network broadcast schedule from the IBS system and convert it into a format that allows a user to make rapid changes at the local station level. Users with access to TM can make these changes directly from their desktop computer (e.g., TM client machine) and do not have to call or go to master control. Once the schedule has been aired through the local station's automation system (RT), TM has a utility that can send a log back to IBS to begin an automated billing process. Log variances are taken into account during this process and prevent unwanted billing from occurring.

The local station's automated broadcasting system (RT) is a comprehensive master control automation system that executes a schedule and broadcasts the designated content (e.g., programs and spots). The RT system controls a master control switcher and associated television broadcast equipment in real time. Though on-air changes are normally made in advance, the master control operator is in no way limited or prevented from making direct manual interventions if the need arises.

The RT system runs on an RT server computer residing in master control of the local station. Through a connection to a facilities local area computer network (LAN), the RT system is able to access schedule files and databases needed for air operations. The RT system may also receive a satellite feed of a network video signal. In addition, the RT system has the ability to copy to an internal memory storage component of this server these schedule files and databases. In the event of a LAN failure the master control operator may recall the backed up schedule and maintain system integrity.

Thus, the combined TM/RT platform is an automated system utilizing a common global platform that is used to schedule, execute, and log the program and commercial (e.g., spots) line-up of owned & operated local stations. The TM system is a menu driven application used to create, edit, and modify the broadcast schedule. The RT system is a comprehensive master control automation system that controls the master control switcher and associated television equipment in real time to effect a television broadcast. The RT system controls the switching between programs and spots during broadcast. The RT system even permits manual intervention when warranted. The RT system resides within master control of the local station and has access to schedule files and databases needed for air operations.

Various embodiments described herein may be implemented as part of a network television schedule management system that permits a local station to receive a network control signal from the network that contains information indicative of an upcoming station break and adjust the switching equipment at the local station to automatically synchronize the station break with the local broadcast schedule. This avoids any potential black screen moments when transitioning between programs and spots in a network broadcast schedule.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

Figure 1:
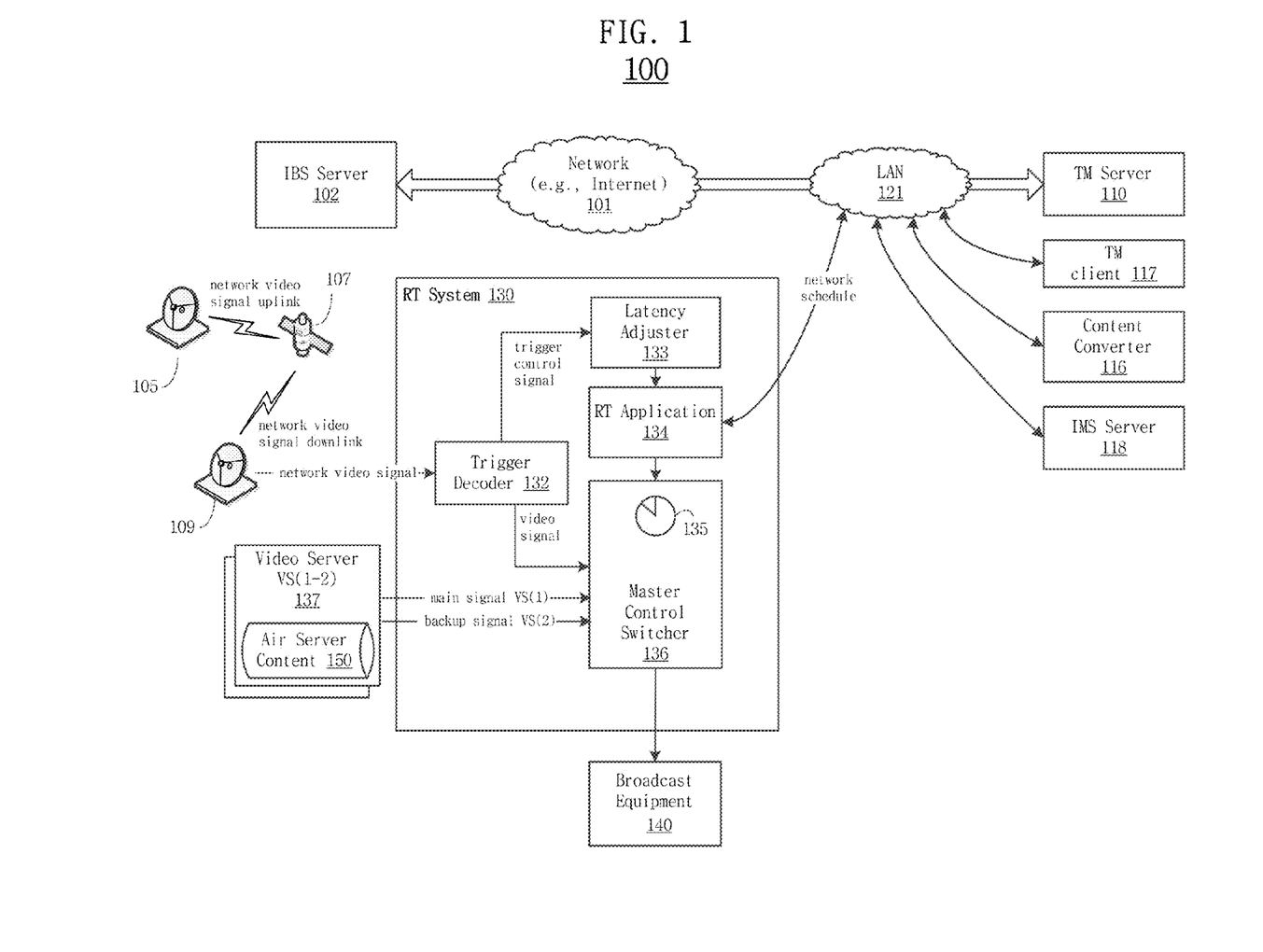
FIG. 1 illustrates a block diagram of an embodiment of a system used to cue a local schedule of programming according to a master network schedule of programming.

FIG. 1 illustrates a block diagram of an embodiment of a system 100 to cue and air a local schedule of programming according to a master network schedule of programming. The system 100 generally resides within a local television station and is communicable with certain components under control of a broadcast network entity such as an integrated broadcast system (IBS) server 102 and a satellite communication system (105, 107, 109).

In one aspect, the IBS server 102 may communicate with a traffic manager (TM) server 110 to provide raw master schedule data to the local station schedule editor over a network 101 such as, for instance, the Internet as well as a local area network (LAN) 121 that services the local television station. The TM server 110 may be accessible by one or more TM client computers 117. Users of the TM client computers 117 may edit the raw schedule data as well as the finished schedule via applications executing on the TM server 110. The System 100 further includes an inventory management system (IMS) server 118 to assist in locating and organizing content (e.g., programs and spots) associated with the local television schedule. A content converter 116 may be used to ensure that all content is converted into a uniform specified format suitable to air.

This aspect is used to collect master schedule data from the network and match it up with the actual content the schedule represents. The content may include local programs, local spots, network promotions, and network programs. The network programs may be received from the network to the local station over a satellite uplink 107 to a satellite 107 and then to a satellite downlink 109.

The system 100 also includes a local broadcasting system known as a Real-Time (RT) system 130. The RT system 130 may include a trigger decoder 132, a latency adjuster 133, an RT application 134, a master control switcher 136, and an air server 138. In addition the RT system 130 may be communicable with one or more video servers 137 that include air server content 150. The RT application 134 may accept schedule input from the TM server 110 via LAN 121 as well as a network video signal via the satellite connection with the network. The satellite connection may include a network video signal uplink 105 transmitting to a satellite 107 and downlinking to a network video signal downlink 109.

The network video signal may include a video signal (e.g., video content for a program) and a trigger control signal. The trigger control signal may be embedded data indicative of an upcoming station break for the program represented by the video signal. The network video signal may be input to the trigger decoder 132 to separate the trigger control signal from the video signal. The video signal may then be sent directly to the master control switcher 136 to be aired under control of the master control switcher 136.

The trigger control signal may be sent to a latency adjuster component 133. The latency adjuster component 133 stores and applies a latency calculation for the local station. The latency calculation is indicative of the difference between the time the network video signal begins at the source and the time the network video signal arrives at the local station destination. This is typically achieved over the satellite connection (105, 107, 109). In addition, this time includes the time needed to encode and decode the network television signal. The station break timing data in the trigger control signal is based on an actual time that the station break should occur. Thus, if the trigger occurs, for example, eight seconds prior to the scheduled break, the master control switcher 136 is instructed to switch to the scheduled spot exactly eight seconds after receiving the trigger. However, this does not account for the small but noticeable latency that occurs in receiving the signal from the network. The delay may be, for example ¼ more or less. The actual delay may vary from local station to local station depending on the actual distance from network to local station via satellite. Each station can calculate its own actual delay and may also periodically re-calculate the delay.

The delay should be accounted for when the master control switcher 136 bases its switching operation on a received trigger signal. The latency adjuster 133 may manipulate the RT system 130 by adding or subtracting a small offset to a computer clock 135 within the master control switcher 136 in which the offset is based on the local station's calculated latency. For example, if the local station's calculated latency is ¼ second, then the RT application 134 may cause the master control switcher clock 135 to jump ahead ¼ second. At this point the trigger signal may act as it normally would without any unwanted dead air time since the master switcher clock 135 has been synchronized with the intended station break timing. Once the trigger time has expired, the master control switcher 136 may switch its outgoing video source to reflect the intended content on the broadcast schedule. The embodiments are not limited to this example.

Figure 2:
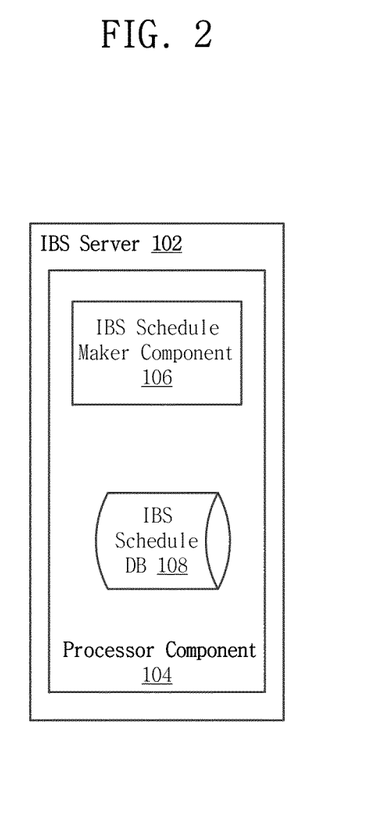
FIG. 2 illustrates a block diagram of an embodiment of an integrated broadcast system (IBS) server.

FIG. 2 illustrates a block diagram of an embodiment of an integrated broadcast system (IBS) server. On the broadcast network side, an integrated broadcast system (IBS) is a menu driven application residing on an IBS server 102 under control of a processor 104. The IBS server 102 may host an IBS schedule maker component 106 and an IBS schedule database 108. The IBS schedule maker component 106 facilitates the creation of a master network schedule of programs and spots that accounts for every second of a day. The schedule may be created months in advance and is not an air-able schedule. The IBS schedule database 108 may then store the master schedules for many months worth of days to cover many local television stations. The embodiments are not limited to this example.

Figure 3:
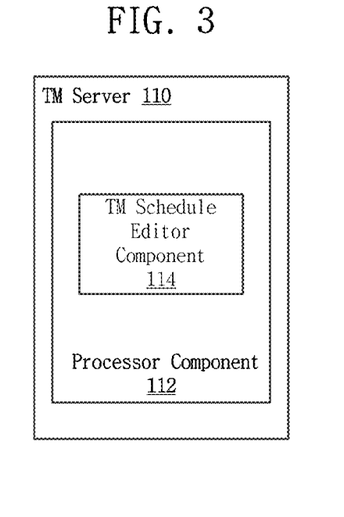
FIG. 3 illustrates a block diagram of an embodiment of a traffic manager (TM) server.

FIG. 3 illustrates a block diagram of an embodiment of a TM server 110. The System 100 utilizes the TM server 110 to receive master schedule data of programs and spots from the IBS server 102. The IBS data is typically received 1-2 days prior to air. A TM schedule editor component 114 operative on a processor component 112 may then convert the master schedule to an air-able schedule. The air-able schedule may then be accessed by multiple users over LAN 121 via a TM client computer 117. Users may make rapid changes to the schedule at the local station level via one or more TM client computers 117 without having to involve master control.

Referring back to FIG. 1, in between the time that a master schedule is imported into the TM server 110 and the time it actually airs, the content associated with the programs and spots on the schedule must be loaded into the air server 138 under control of the RT system 130. To assist in this process, the IMS server 118 may be operative to load program and spot content into one or more video servers 137.

Figure 4:
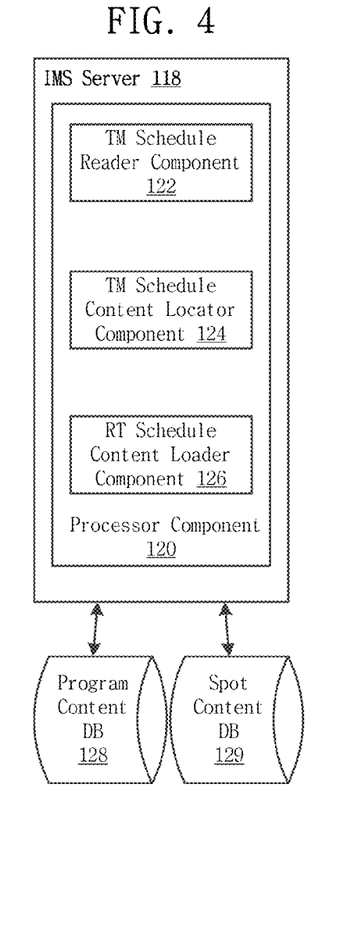
FIG. 4 illustrates a block diagram of an embodiment of an inventory management system (IMS) server.

FIG. 4 illustrates a block diagram of an embodiment of an IMS server 118. The IMS server 118 may include a TM schedule reader component 122, a TM schedule content locator component 124, and an RT schedule content loader component 126. Each of the TM schedule reader component 122, TM schedule content locator component 124, and RT schedule content loader component 126 may be operative on a processor component 120. The TM schedule reader component 122 may be operative to read and parse the schedule created by the TM schedule editor component 114 to identify each of the programs and spots (e.g., content) listed on the schedule. Each piece of content (e.g., program or spot) is indicative of a video file. The TM schedule content locator component 124 may then search for and locate each piece of content identified by the TM schedule reader component 122. The TM schedule content locator component 124 may have access to a program content repository 128 and a spot content repository 129. The program content repository 128 may store formatted video files of program content while the spot content repository 129 may store formatted video files of spot content.

Video content may be generated in any number of file formats. However, all content must be converted to a single format for air. The format must be interpretable by the broadcast equipment. Referring back to FIG. 1, the system 100 utilizes the content converter 116 to ensure that all files are in the same specified format. The content converter 116 may receive a video file in one of many file formats and convert it to the specified format of the system 100 and place it in the program content repository 128 or the spot content repository 129 depending on whether the content is for a program or a spot. The RT schedule content loader component 126 may then copy each piece of content located by the TM schedule content locator component 124 from its current location to one or more air server content repositories 150.

At this point, the TM portion of the system 100 has completed its job by creating an air-able schedule and placing the content it has access to that is associated with that schedule into the RT system 130. Changes may still be made via the one or more TM client computers 117 should any be warranted.

When the time comes to air the schedule, the RT system 130 may be automatically set up to do so. The RT system 130 may be a comprehensive master control automation system that controls a master control switcher 136, a master control switcher clock 135, an air server 138, and associated television broadcast equipment 140 in real time via an RT application 134. The RT system 130 may even permit manual intervention should such intervention be warranted. The RT system 130 may have access to schedule files and storage components that are needed for air operations.

The master control switcher 136 may receive video signals from the video server 137 over video server channels (e.g., VS1, VS2) as well as from a satellite connection (105, 107, 109) with the network. The video signals may include the programs and spots stored in the properly scheduled order. Depending on the level of redundancy, the master control switcher may receive video signals from more than two video server channels. For the sake of illustration, two video server channels (VS1 and VS2) have been shown. The first, VS1, is indicative of the main or primary video server channel to be aired. The second, VS2, is a backup to the first in case a problem arises with the first video server.

Typically, the master control switcher 136 will select between the main signal (VS1) or the network video signal received over the satellite connection (105, 107, 109). The selected signal will then be supplied to the broadcast equipment 140 (e.g., cable operators, satellite operators, over-the-air, etc.) to be broadcast to end-users. Any latency adjustments may be made to the master control switcher clock 135 via the RT application 134.

The RT application 134 may perform other functions as well. For example, the RT application 134 may continually check each defined video server 137 to determine whether the content exists in that server. The content may be arranged in a stack according to its position in the schedule. The RT application 134 may begin at the top of the stack and issue a query to each video server 137 to determine if the current event in the stack is present. The RT application 134 may wait for a response from each video server 137 before moving to the next event in the stack. This continues at a rate of approximately 1-2 events per second until the stack has been exhausted at which point the process repeats from the top of the stack. If an event has been deleted from a video server 137, the RT application 134 may warn an operator within a few seconds.

The RT application 134 may also determine if a video server 137 is non-responsive. Using the queries described above, the RT application 134 may implement a timeout function that will return a non-acknowledgement response to the RT application if no response to the video server queries is received. After a user-specified number of non-acknowledgment response are received, the RT application 134 may place the non-responding video server 137 off-line and notify an operator that a video server 137 has been taken off-line. In such a case, the RT application 134 can cause the master control switcher 136 to switch to a functioning video server 137 to maintain system integrity.

The air server 138 is typically operative to air the video signal coming from the master control switcher 136 and send it to each of the distributing entities broadcasting equipment 144, 146, 148. In some embodiments a cable operator, a satellite operator, and an over-the-air (OTA) distribution method may be implemented. It should be understood that there may be more or fewer television service providers associated with the local television station. The embodiments are not limited to this example.

Figure 5A:
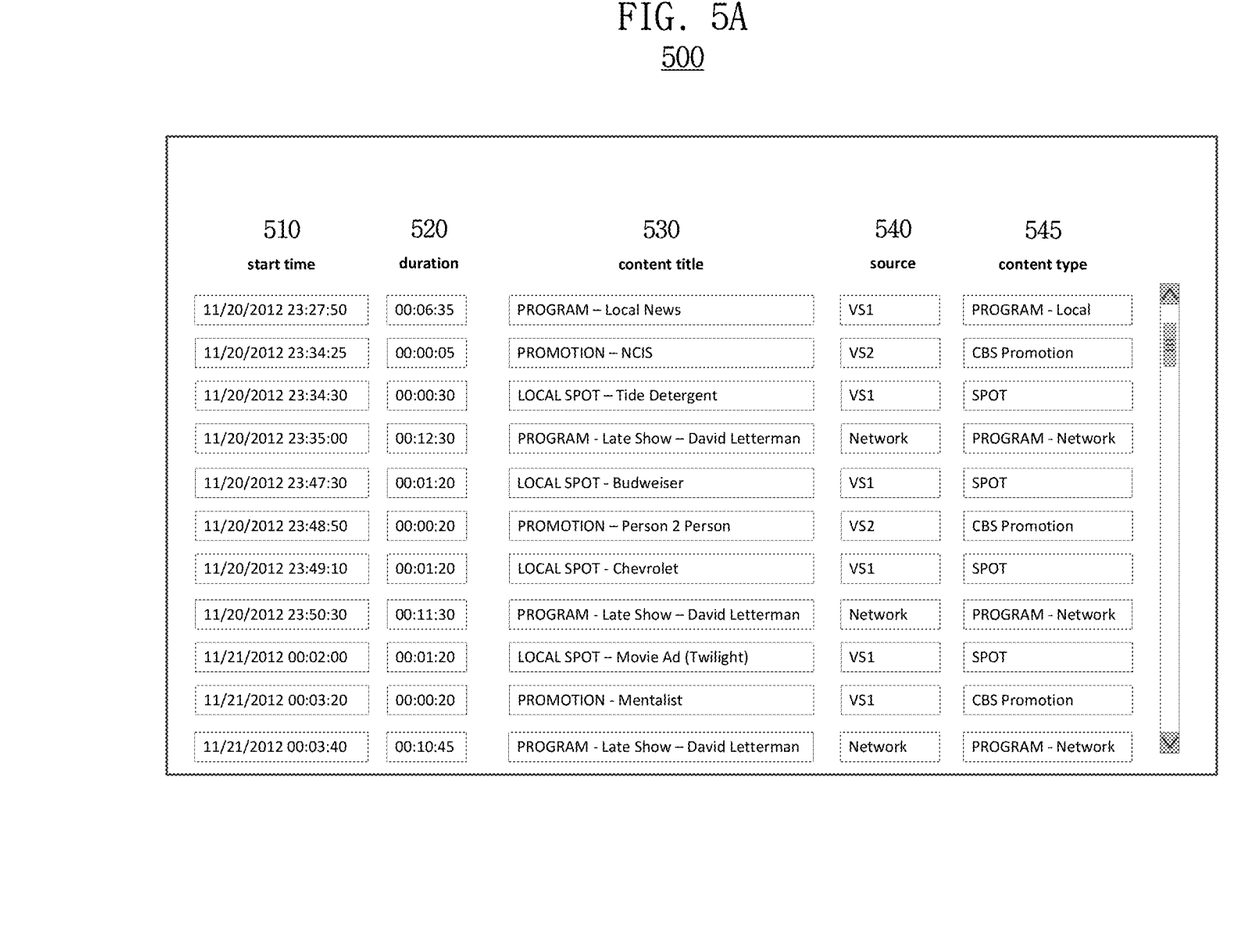
FIG. 5A illustrates a typical schedule to be implemented by the system.

FIG. 5 illustrates a typical schedule 500 to be implemented and aired by the RT system 130. The schedule 500 may include columns for a start time 510, a duration 520, content title 530, video source 540 and content type 545. The schedule is essentially a chronological table that accounts for programming for every second of the day. In this example, the time between 23:27:50 and 00:03:40 is illustrated. Each time segment under the time column 510 is indicative of a start time for a piece of content from the content title column 530. The duration column 520 indicates to the RT system 130 how long the current piece of content lasts before switching to the next piece of content. The source column indicates where the video content is located—e.g., on which local server or from the network satellite feed. The content type column 545 indicates what the type of the content is (e.g., a program, a promotion, or an advertisement/spot).

In some cases, the network side may be continually editing a program up until its actual air time. This may be especially true of programs that are recorded only hours before they air such as a late night talk show. The network may adjust the placement of station breaks so as to accommodate the ebb and flow of events that were recorded. This helps prevent awkward or abrupt interruptions in interviews or other segments. This may also occur for live programming such as sporting events as well.

In this example, the schedule 500 is picked up at time 23:27:50 (e.g., 11:27:50 PM) with the last segment of a local news broadcast. A transition or switch occurs at 23:34:25 when a promotional spot for an upcoming episode of the TV show "NCIS" is shown. The master control switcher 136 may switch its output signal from the source carrying the local news broadcast to the source containing the NCIS promotional spot. This may be followed by a local spot at 23:34:30 before the next network feed program (Late Show—David Letterman) begins at 23:35:00.

The local news, promotion, and local spot may have been fixed in the schedule 500 in advance and are under local control. The Late Show—David Letterman, however, is a network program that was likely taped only a few hours in advance of its airing. A template for the station breaks may have been provided well in advance and it may have been entered into the local TM server 110 for execution by the RT system 130. Often times, however, the network side may not finish final edits of the show until just before airing. Final edits may cause a shift in the placement of station breaks that are inconsistent with the previously supplied station breaks in the template. These shifts must be accounted for in the RT system 130 to ensure that there are no unwanted dead air black screen moments. This may be done by encoding station break triggers into the network video signal that signal when an upcoming station break is to occur. Accounting for the shifts also includes accounting for the latency between when the information was sent and when it is received (e.g., the satellite transmission time). The station break triggers may be designed to override the existing schedule that the RT system 130 is using. Typically, the trigger will be sent on or about eight seconds before the break is to occur. The embodiments, however, are not limited to only an eight second warning.

As an example, suppose the Late Show—David Letterman was edited on the network side just prior to air time causing the first station break to be shifted a few seconds. Rather than follow the previous schedule from the TM server 110, the RT application 134 may use the latency adjusted trigger information to play the station break. The RT application may then adjust the schedule from the TM server 110 to reflect the shift and continue switching according to the adjusted schedule unless and until another trigger that is inconsistent with the schedule is received. If such a trigger is received, the RT application 134 may repeat its handling of the trigger and updating of the schedule to ensure that unwanted dead air time does not occur.

Figure 5B:
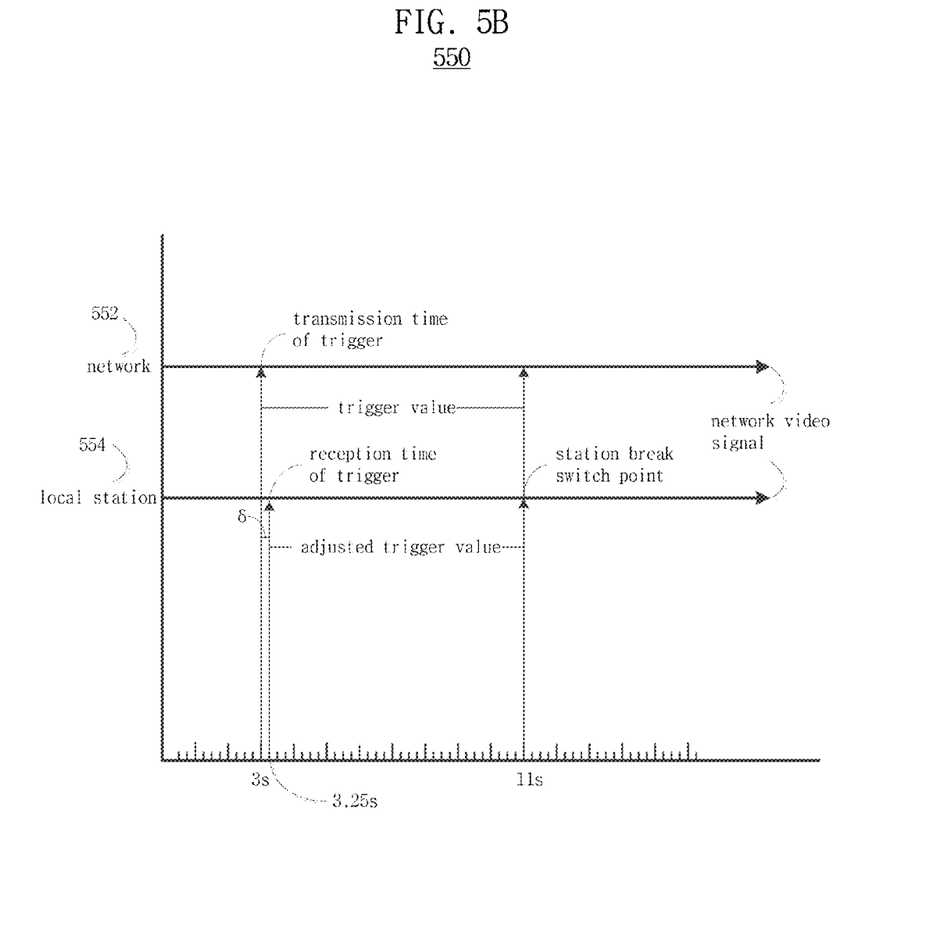
FIG. 5B illustrates an example of a timing diagram.

FIG. 5B illustrates an example of a timing diagram 550. A network entity 552 transmits a network video signal at time=3 s to a local station 554. The local station actually receives the network video signal at time=3¼ s representing a delay (δ) of ¼ seconds. As described above, the delay is the transmission time over a satellite connection from the network to the local station. The network video signal may include a trigger control signal that identifies points in the network video signal that correspond to station breaks. The trigger control signal is typically a control signal that instructs the master control switcher 136 to switch video sources after a specified time period expires. In this example, the trigger value is 8 seconds. Thus, the master control switcher 136 should switch from the network video signal to another source exactly 8 seconds after the trigger is executed. However, the 8 seconds does not account for the delay (δ) of ¼ seconds that it took to send and receive the network video signal. The RT application 134 knows the delay (δ) and can reset the master control switcher clock 135 ahead ¼ seconds. This effectively accounts for the transmission delay and synchronizes the network side with the local station side of the broadcast.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
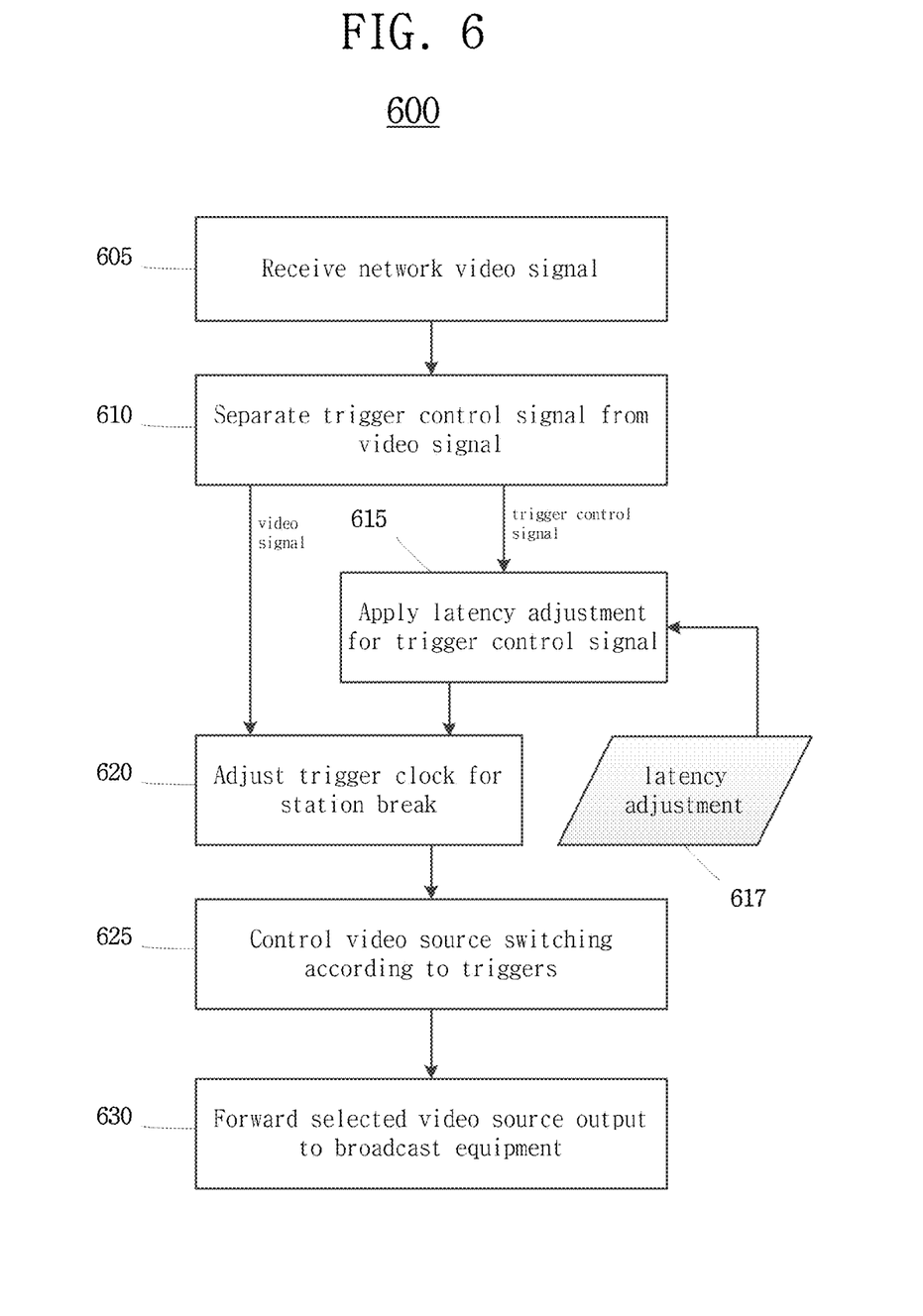
FIG. 6 illustrates an embodiment of a logic flow.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive a network video signal at block 605. For example, the RT system 130 may receive a network video signal via a satellite connection (105, 107, 109) from the network. The network may represent a centralized location in which program content is collected and finalized before distribution to affiliates (e.g., local television stations). The network video signal may include a video signal and embedded trigger control signals. The video signal may be the actual program content while the embedded trigger control signal may be indicative of data that identifies an exact time for an upcoming station break. The exact time may be in relative form such as eight seconds from receipt of the trigger. The embodiments are not limited to these examples.

In the illustrated embodiment shown in FIG. 6, the logic flow 600 may separate the trigger control signal from the video signal at block 610. For example, the trigger decoder 132 may separate the video signal from the trigger control signal. The video signal may be forwarded to the master control switcher 136 while the trigger control signal may be forwarded to the latency adjuster 133. The embodiments are not limited to these examples.

In the illustrated embodiment shown in FIG. 6, the logic flow 600 may apply a latency adjustment for the trigger control signal at block 615. For example, the latency adjuster 133 may obtain a delay value to account for the encoding/decoding and satellite transmission latency. The latency adjuster component 133 may retrieve the latency adjustment for the local station from a data store 617. The latency adjustment may be calculated by local station equipment by measuring the time it takes to receive a signal from a network source. The latency adjustment is indicative of the difference between the time the network video signal begins at the source and the time the network video signal arrives at the local station destination. This is typically achieved over the satellite connection (105, 107, 109). In addition, this time includes the time needed to encode and decode the network television signal.

The station break timing data in the trigger control signal is based on an actual time that the station break should occur. Thus, if the trigger occurs, for example, eight seconds prior to the scheduled break, the master control switcher 136 is instructed to switch to the scheduled spot exactly eight seconds after receiving the trigger. However, this does not account for the small but noticeable latency that occurs in encoding, receiving, and decoding the signal from the network. The delay may be, for example ¼ second more or less. The actual delay may vary from local station to local station depending on the actual distance from network to local station via satellite. Each station can calculate and periodically re-calculate its own actual delay. The embodiments are not limited to these examples.

In the illustrated embodiment shown in FIG. 6, the logic flow 600 may adjust the trigger for a station break at block 620. For example, the RT application 134 may adjust the master control switcher clock 135 by re-setting it with an offset that reflects the latency (e.g., delay) occurring as a result of the satellite transmission. In the example above, the offset would be equal to ¼ second. Thus, the eight second trigger would be reduced to 7¾ seconds since the master control switcher clock 135 would be forcibly advanced by ¼ second. This ensures that the station break actually occurs at its intended time. The embodiments are not limited to these examples.

In the illustrated embodiment shown in FIG. 6, the logic flow 600 may control video source switching according to the trigger control signal at block 625. For example, the master control switcher 136 may receive a trigger control signal from the RT application 134 and one or more video signals from one or more video sources. The video sources may include one or more video servers that contain content scheduled to be broadcast. The content may include programs, advertisement spots, and network promotions. A network satellite feed of a video signal may also be provided to the master control switcher 136. The RT application 134 may control the switching process that occurs in the master control switcher 136. The RT application 134 has knowledge of the broadcast schedule and can control the master control switcher 136 to switch among the various video sources to cue up the intended content at the intended time. The RT application may also override the schedule in favor of a trigger control signal that has been decoded and adjusted to account for a satellite communication latency as previously described. In such cases, the RT application 134 may change the time of a station break to sync up with the time specified in the trigger control signal. The embodiments are not limited to these examples.

In the illustrated embodiment shown in FIG. 6, the logic flow 600 may forward a video signal from a selected video source to broadcast equipment at block 630. For example, the master control switcher 136 may forward a selected video source to the broadcasting equipment 140. The broadcasting equipment 140 may include equipment operative to deliver the video signal to subscribers and consumers over a cable operator's network, a satellite operator's network, a telephone operator's video network, and over-the-air (OTA). The embodiments are not limited to these examples.

Figure 7:
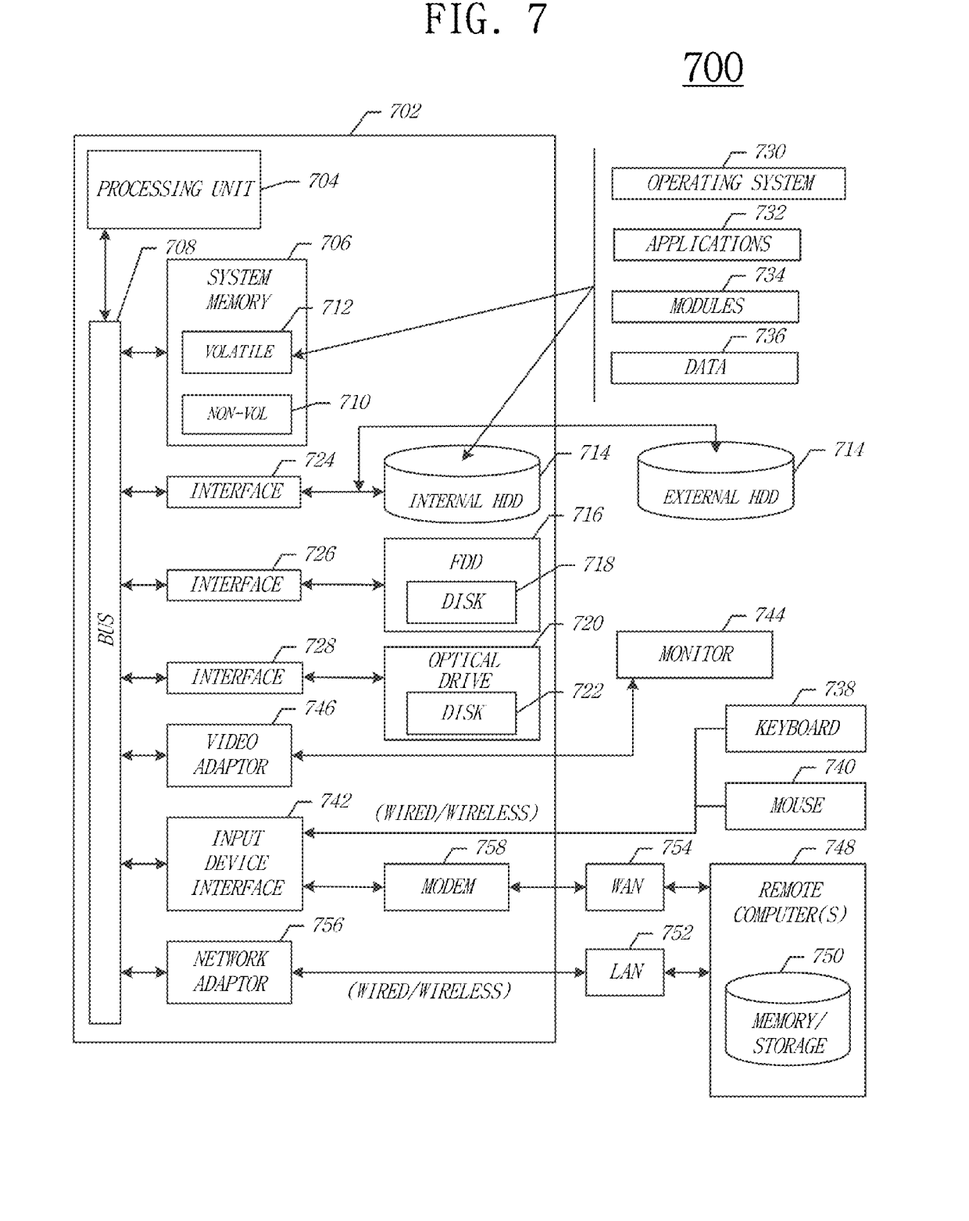
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 102 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.19 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
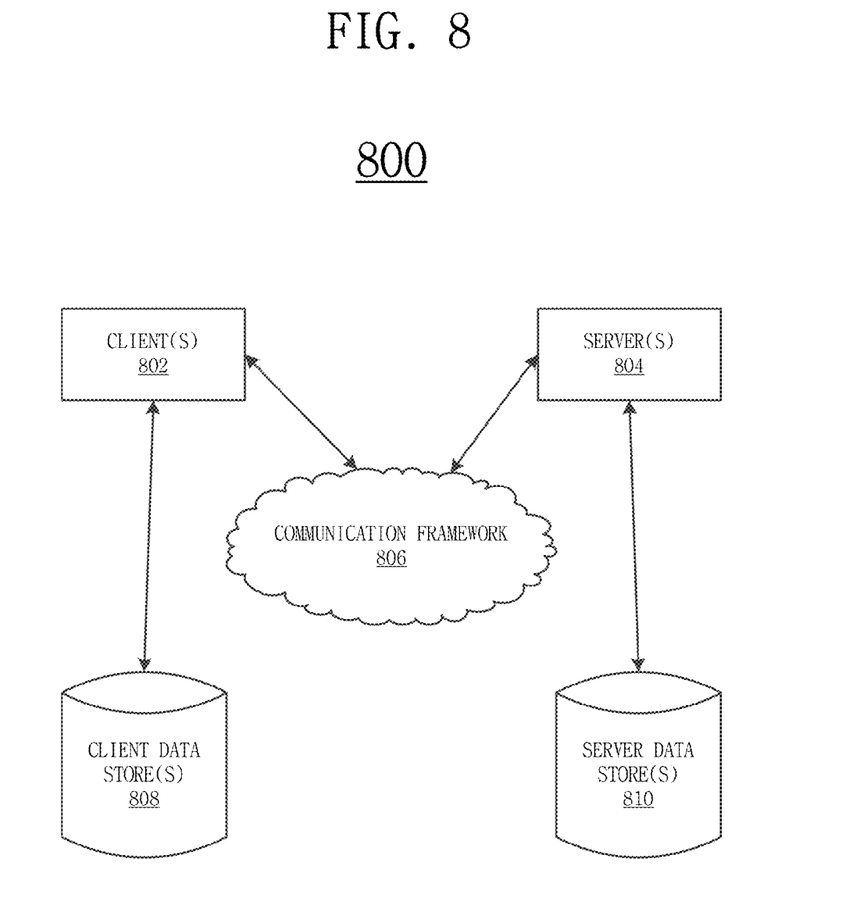
FIG. 8 illustrates an embodiment of a communications architecture.

FIG. 8 illustrates a block diagram of an exemplary communications architecture 800 suitable for implementing various embodiments as previously described with reference to FIGS. 1-7. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may implement the client device 610. The servers 804 may implement the server device 750. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A system, comprising:
a trigger decoder to receive a network video signal for a network program, the network video signal comprised of a video signal and a trigger control signal, the trigger control signal comprising a time period indicative of how long until a station break is to occur within the network program, the trigger decoder to separate the video signal from the trigger control signal;
a latency adjuster to obtain a time delay, the time delay indicative of a combination of time difference between a time the network video signal begins at a source and a time the network video signal arrives at a local station destination and a time for encoding and decoding the network video signal;
a clock that is reset based on the time delay; and
a master control switcher to receive the network video signal for the network program, and one or more video signals from one or more video servers containing video content, and to select one of the video signals from the one or more video servers to switch output of the network video signal at a time controlled by the trigger control signal and the reset clock, wherein the time for switching from the network video signal for the network program to the selected one of the video signals overrides a switching time in an existing scheduled station break.

2. The system of claim 1, the network video signal for a network program received from a network broadcaster over a satellite communication system.

3. The system of claim 1, wherein the latency adjuster periodically re-calculates the time delay.

4. The system of claim 1, wherein the clock is reset by jumping ahead by an offset equal to the time delay.

5. The system of claim 1, wherein the master control switcher switches from the network video signal for the network program to the selected one of the video signals after the trigger expires.

6. The system of claim 1, comprising broadcasting equipment to receive and broadcast the video signal output of the master control switcher.

7. The system of claim 6, the broadcasting equipment comprising over-the-air (OTA) broadcasting equipment.

8. The system of claim 6, the broadcasting equipment comprising cable television broadcasting equipment.

9. The system of claim 6, the broadcasting equipment comprising satellite television broadcasting equipment.

10. The system of claim 6, the broadcasting equipment comprising telephone service provider television broadcasting equipment.

11. A computer-implemented method, comprising:
receiving a network video signal for a network program, the network video signal comprised of a video signal and a trigger control signal, the trigger control signal comprising a time period indicative of how long until a station break is to occur within the network program;
separating the video signal from the trigger control signal;
obtaining a time delay, the time delay indicative of a combination of time difference between a time the network video signal begins at a source and a time the network video signal arrives at a local station destination and a time for encoding and decoding the network video signal;

resetting a clock based on the time delay; and switching from the network video signal for the network program to selected one of the video signals received from one or more video servers at a time controlled by the trigger control signal and the reset clock, wherein the time for switching from the network video signal for the network program to the selected one of the video signals overrides a switching time in an existing scheduled station break.

12. The computer-implemented method of claim 11, comprising receiving the network video signal for a network program from a network broadcaster over a satellite communication system.

13. The computer-implemented method of claim 11, comprising periodically re-calculating the time delay.

14. The computer-implemented method of claim 11, wherein resetting the clock comprises jumping ahead by an offset equal to the time delay.

15. The computer-implemented method of claim 11, comprising switching from the network video signal for the network program to the selected one of the video signals after the trigger expires.

16. The computer-implemented method of claim 11, comprising broadcasting the video signal.

17. The computer-implemented method of claim 16, comprising broadcasting the video signal using over-the-air (OTA) broadcasting equipment.

18. The computer-implemented method of claim 16, comprising broadcasting the video signal using cable television broadcasting equipment.

19. The computer-implemented method of claim 16, comprising broadcasting the video signal using satellite television broadcasting equipment.

20. The computer-implemented method of claim 16, comprising broadcasting the video signal using telephone service provider television broadcasting equipment.

21. A non-transitory computer-readable storage medium comprising instructions that, when executed, cause a system to:

receive a network video signal for a network program, the network video signal comprised of a video signal and a trigger control signal, the trigger control signal comprising a time period indicative of how long until a station break is to occur within the network program;

separate the video signal from the trigger control signal;

obtain a time delay, the time delay indicative of a combination of time difference between a time the network video signal begins at a source and a time the network video signal arrives at a local station destination and a time for encoding and decoding the network video signal;

reset a clock based on the time delay; and switch from the network video signal for the network program to selected one of the video signals received from one or more video servers at a time controlled by the trigger control signal and the reset clock, wherein the time for switching from the network video signal for the network program to the selected one of the video signals overrides a switching time in an existing scheduled station break.

22. The non-transitory computer-readable storage medium of claim 21, comprising instructions that when executed cause the system to receive the network video signal for a network program from a network broadcaster over a satellite communication system.

23. The non-transitory computer-readable storage medium of claim 21, comprising instructions that when executed cause the system to periodically re-calculate the time delay.

24. The non-transitory computer-readable storage medium of claim 21, comprising instructions that when executed cause the system to reset the clock by jumping ahead by an offset equal to the time delay.

25. The non-transitory computer-readable storage medium of claim 21, comprising instructions that when executed cause the system to switch from the network video signal for the network program to the selected one of the video signals after the trigger expires.

26. The non-transitory computer-readable storage medium of claim 21, comprising instructions that when executed cause the system to broadcast the video signal.

27. The non-transitory computer-readable storage medium of claim 26, comprising instructions that when executed cause the system to broadcast the video signal using over-the-air (OTA) broadcasting equipment.

28. The non-transitory computer-readable storage medium of claim 26, comprising instructions that when executed cause the system to broadcast the video signal using cable television broadcasting equipment.

29. The non-transitory computer-readable storage medium of claim 26, comprising instructions that when executed cause the system to broadcast the video signal using satellite television broadcasting equipment.

30. The non-transitory computer-readable storage medium of claim 26, comprising instructions that when executed cause the system to broadcast the video signal using telephone service provider television broadcasting equipment.

* * * * *